United States Patent
Min et al.

(10) Patent No.: US 7,685,934 B2
(45) Date of Patent: Mar. 30, 2010

(54) REFRIGERATOR AND METHOD FOR KEEPING FOOD USING THE SAME

(75) Inventors: Deul Re Min, Seoul (KR); Eun Jeong Kim, Gyeongsangnam-do (KR); Jong Min Shin, Busan (KR); Seok Min Lim, Gyeongsangnam-do (KR); Yeon Yi Hwang, Busan (KR)

(73) Assignee: LG Electronics Inc., Seoul (KR)

( * ) Notice: Subject to any disclaimer, the term of this patent is extended or adjusted under 35 U.S.C. 154(b) by 586 days.

(21) Appl. No.: 11/585,347

(22) Filed: Oct. 24, 2006

(65) Prior Publication Data
US 2007/0104841 A1    May 10, 2007

(30) Foreign Application Priority Data

| Oct. 25, 2005 | (KR) | ...................... 10-2005-0100848 |
| Oct. 26, 2005 | (KR) | ...................... 10-2005-0101287 |
| Oct. 26, 2005 | (KR) | ...................... 10-2005-0101289 |
| Oct. 26, 2005 | (KR) | ...................... 10-2005-0101292 |

(51) Int. Cl.
*A23L 1/00* (2006.01)
(52) U.S. Cl. .......................................... 99/451; 99/517
(58) Field of Classification Search ........... 99/326–333, 99/339, 340, 348, 352–355, 467–479, 485–491, 99/517, 483, 451; 374/102–106, 160–162; 62/343, 342, 62, 66, 78, 93, 340, 285–291; 422/58, 22; 116/207–216
See application file for complete search history.

(56) References Cited

U.S. PATENT DOCUMENTS

| 3,656,909 | A | * | 4/1972 | Dixon et al. ................... 422/58 |
| 4,469,452 | A | * | 9/1984 | Sharpless et al. ............. 374/160 |
| 4,601,588 | A | * | 7/1986 | Takahara et al. ............. 374/106 |
| 4,643,588 | A | * | 2/1987 | Postle et al. ................. 374/160 |
| 5,779,364 | A | * | 7/1998 | Cannelongo et al. ........ 374/160 |
| 5,795,065 | A | * | 8/1998 | Barham ...................... 374/106 |
| 6,382,125 | B1 | * | 5/2002 | Tamura ...................... 116/207 |

* cited by examiner

*Primary Examiner*—Timothy F. Simone
(74) *Attorney, Agent, or Firm*—KED & Associates, LLP

(57) ABSTRACT

A refrigerator and a method for keeping food items fresh therein are provided. The refrigerator may include a main body, storage compartments provided in the main body to store food items therein, and irradiation devices that irradiate visible light into the storage compartments. The irradiation devices may switch a wavelength of irradiated light depending on the type of food items stored in the corresponding storage compartment. The refrigerator may also include a sensor that senses whether food items are stored in the storage compartments, and purification devices provided in the compartments to remove ethylene generated by the food items stored in the storage compartments.

19 Claims, 16 Drawing Sheets

REFRIGERATOR AND METHOD FOR KEEPING FOOD USING THE SAME

This application claims the benefit of Korean Application No. 10-2005-0100848, filed on Oct. 25, 2005, 10-2005-0101287, filed on Oct. 26, 2005, 10-2005-0101289, filed on Oct. 26, 2005, 10-2005-0101292, filed on Oct. 26, 2005, which is hereby incorporated by reference as if fully set forth herein.

BACKGROUND OF THE INVENTION

1. Field of the Invention

The present invention relates to a refrigerator, and more particularly, to a refrigerator and a method for keeping food fresh using the same, in which freshness is maintained for a long time through an improved structure and decrease of nutritive elements contained in the food is inhibited.

2. Discussion of the Related Art

Generally, a refrigerator includes a freezing chamber and a refrigerating chamber. The refrigerating chamber is provided with a separate vegetable compartment that serves to keep vegetables and fruits more freshly by controlling humidity. Hereinafter, vegetables and fruits will be referred to as "vegetables." Accordingly, the vegetable compartment inside the refrigerating chamber may be an example of a food container.

Temperature, humidity, environmental gas, microbe, and light are known as main factors that deteriorate freshness of vegetables. Since vegetables continue to breathe and transpire, it is essentially required that breathing and transpiration should be inhibited to maintain freshness of the vegetables. Specifically, most of the vegetables excluding some vegetables that cause disorder at a low temperature can be inhibited from breathing at a low temperature and can be prevented from transpiring at high humidity.

In this respect, a general refrigerator for home use includes a food container which serves as a separate space independent of a refrigerating chamber and is only used to keep vegetables, so that the vegetables can be maintained with freshness for a long time. The food container maintains vegetables at a proper low temperature and at the same time controls humidity using water transpired from the vegetables. Accordingly, the vegetables can be maintained with freshness for a long time by the food container.

Meanwhile, methods for maintaining freshness of vegetables for a long time by using light have been recently suggested.

Strong light adversely affects food in such a way to expedite discoloration and transpiration of the food. On the other hand, it is known that relatively weak light serves to improve freshness of vegetables. It is also known that such weak light inhibits decomposition of chlorophyll in green vegetables and effectively maintains vitamin C.

Hereinafter, a related art refrigerator having a food container will be described with reference to FIG. 1.

FIG. 1 illustrates a top mount type refrigerator in which a freezing chamber is disposed at a top portion and a refrigerating chamber is disposed below the freezing chamber.

The related art refrigerator is disclosed in Japanese Patent Publication Pyung9-28363. Referring to FIG. 1, this related art refrigerator 10 includes a drawer type food container 20 provided at a lower portion and an irradiation device 23 irradiating weak light to the food container 20, to prevent reduction in the concentration of chlorophyll in green vegetables, and prevent deterioration in quality of the green vegetables.

In particular, the refrigerator 10 is designed such that a lamp 29 is operated to allow a user to recognize an object in a keeping compartment 21 when the drawer type food container is opened while the irradiation device 23 is operated to prevent quality of green vegetables from being deteriorated due to light when the drawer type food container is closed.

Meanwhile, Japanese Patent Publication No. Pyung 11-159953 discloses an irradiation device comprised of a light emitting diode (LED) of a visible ray area to minimize emission of heat caused by the irradiation device, whereby a temperature in a keeping compartment is prevented from increasing and the irradiation device is driven at higher efficiency than other irradiation devices.

Furthermore, Japanese Patent Publication No. 2005-49093 discloses a red LED having a wavelength of 660 nm applied to green vegetables.

Moreover, Japanese Patent Publication No. 2005-65622 discloses an irradiation device that irradiates light of a proper wavelength depending on kinds of vegetables by dividing a food container into a plurality of keeping compartments. In more detail, this related art discloses three LEDs of red, green and blue to select combination of light-emitting colors depending on kinds of vegetables.

However, the related art food container has several problems.

First, although the related art irradiation device can select combination of light-emitting colors through the three-colored LEDs of red, green and blue, it is not apparent for what food the LEDs are effective. For this reason, the irradiation device is little effective in maintaining freshness of food or preventing chlorophyll from being reduced.

Second, it is not apparent that various kinds of foods should be kept separately in a plurality of keeping compartments based on which classification standard even though the food container is divided into the plurality of keeping compartments. Accordingly, there is no effectiveness that can be obtained as the food container is divided into a plurality of keeping compartments.

Third, although there is provided a selecting means for selecting light-emitting colors of the three-colored LEDs, the selecting means has little effectiveness as it is impossible to identify what a light-emitting color of light suitable for a specific food is.

Even though it is possible to identify a light-emitting color depending on kinds of foods through experiments, there exists inconvenience in that a user should remember or search such information of light emitting colors to select a light-emitting color of irradiated light.

Fourth, problems relating to reliability of the irradiation device occur in that the user cannot determine whether to select which light-emitting color for a food which is not identified by experiments and that the user cannot identify whether its selected light-emitting color is suitable for a corresponding food.

Fifth, although the user can select a light-emitting color obtained by combination of three colors from the three-colored LEDs, the selected light-emitting color is uniformly irradiated to various kinds of foods in spite of the fact that an effective light-emitting color depends on kinds of the foods. For this reason, if various kinds of foods are kept in the keeping compartments, freshness of every food is not maintained uniformly.

Sixth, a light source of a vegetable box is always turned on regardless of the presence of vegetables. Also, since an LED used as the light source in the vegetable box of the refrigerator has power consumption in the range of 0.1 W to 1 W, unnecessary power consumption occurs if the light source continues to be turned on.

Seventh, heat is emitted inevitably if the light source is turned on. In this case, a problem occurs in that a temperature of the vegetable box and/or the refrigerating chamber increases.

Finally, a problem occurs in that the related art food container may decay fruits or quickly wither vegetables due to ethylene generated from the food kept therein.

SUMMARY OF THE INVENTION

Accordingly, the present invention is directed to a refrigerator and a method for keeping food using the same, which substantially obviate one or more problems due to limitations and disadvantages of the related art.

An object of the present invention is to provide a refrigerator and a method for keeping food using the same, in which freshness is maintained for a long time through an improved structure and decrease of nutritive elements contained in the food is inhibited.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a refrigerator according to the present invention includes a main body, keeping compartments provided in the main body, keeping food, and irradiation devices irradiating light of a visible ray area to the keeping compartments.

Preferably, the irradiation devices include light emitting diodes (LEDs).

The irradiation devices switch a wavelength of irradiated light depending on a set standard.

The refrigerator further includes a sensor sensing whether food is contained in the keeping compartments, wherein the irradiation devices irradiate light to the keeping compartments depending on the sensed result of the sensor.

Preferably, the sensor is comprised of an optical sensor. The optical sensor is provided at a sidewall of the keeping compartments.

Alternatively, the sensor is comprised of a weight sensor.

Meanwhile, the refrigerator further includes purification devices provided in the keeping compartments to remove ethylene generated from the food kept in the keeping compartments.

The purification devices are comprised of palladium catalyst, and include a globular hollow core and a porous carbon shell, the porous carbon shell including a plurality of nano carbon balls into which antibacterial metal or metal base is impregnated.

The irradiation devices switch the wavelength of the light to correspond to color of the food kept in the keeping compartments.

Preferably, the keeping compartments are provided in plural numbers.

The refrigerator further includes selection devices selecting a kind of food kept in the keeping compartments and switching the wavelength of the light irradiated from the irradiation devices to correspond to color of the corresponding food. Alternatively, the refrigerator further includes a recognition device sensing color of the food kept in the keeping compartments and switching the wavelength of the light irradiated from the irradiation devices to correspond to color of the corresponding food.

At this time, the irradiation devices switch the wavelength of the light depending on time. Also, the irradiation devices periodically switch the wavelength of the light.

Preferably, the irradiation devices irradiate light obtained by combination of wavelengths of red, green and white. Also, the irradiation devices irradiate light obtained by combination of wavelengths of yellow and blue.

Alternatively, the irradiation devices irradiate a red wavelength if color of the food kept in the keeping compartments is red based color. The irradiation devices irradiate a green wavelength if color of the food kept in the keeping compartments is green based color. At this time, the irradiation devices irradiate light by further including a white wavelength.

In another aspect of the present invention, a method for keeping food using a refrigerator includes the steps of (a) keeping food in keeping compartments, (b) irradiating light of a visible ray area to the food kept in the keeping compartments, and (c) switching a wavelength of light irradiated to the food depending on a set standard.

The step (c) includes switching the wavelength of the light to correspond to color of the food kept in the keeping compartments.

Preferably, the step (a) includes selecting a kind of the food kept in the keeping compartments.

Alternatively, the step (a) includes sensing color of the food kept in the keeping compartments.

Alternatively, the step (c) includes switching the wavelength of the light depending on time. Also, the step (c) includes periodically switching the wavelength of the light.

The step (b) includes stopping irradiating light if there is no food in the keeping compartments.

According to the present invention, since various kinds of foods are kept in the keeping compartments depending on their colors and light most suitable for color of a corresponding food is irradiated to the food, it is possible to effectively maintain freshness of the food through the irradiation devices and prevent the concentration of chlorophyll from being reduced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 15A and 15B are sectional views illustrating a vegetable box of FIG. 14, in which FIG. 15A illustrates the state that a light source is turned on and FIG. 15B illustrates the state that the light source is turned off.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
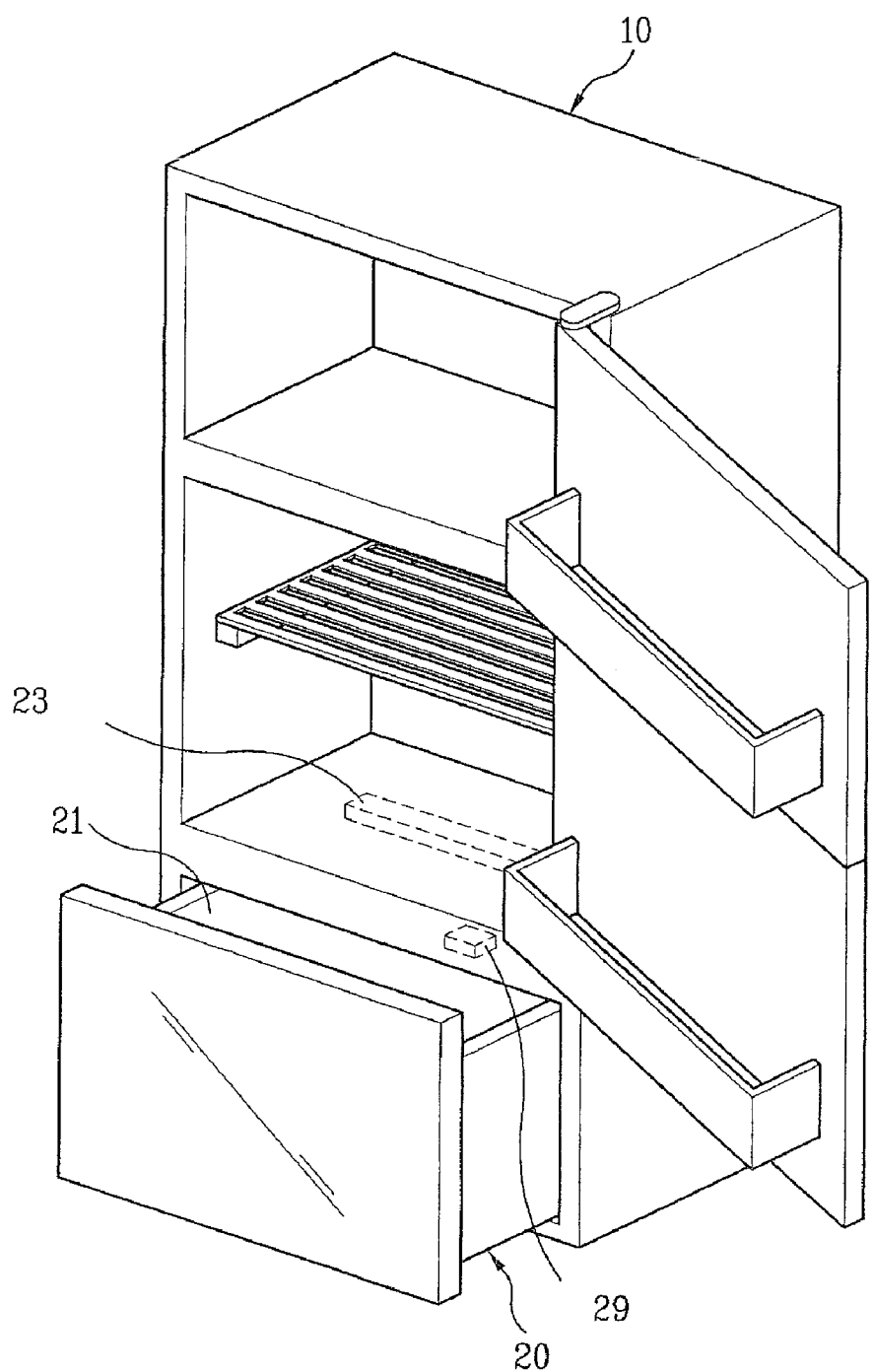
FIG. 1 is a perspective view illustrating a related art refrigerator having a food container.
Figure 2:
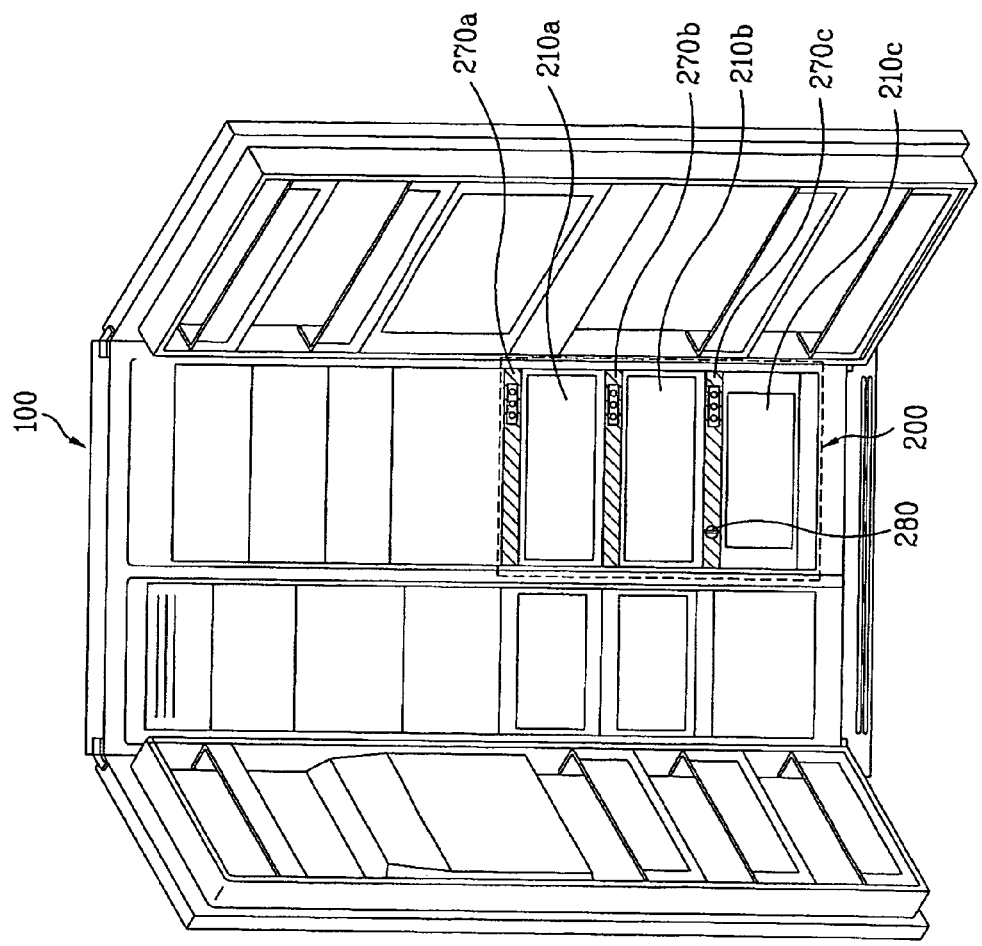
FIG. 2 is a perspective view illustrating the state that a food container according to the present invention is applied to a side by side type refrigerator.
Figure 3:
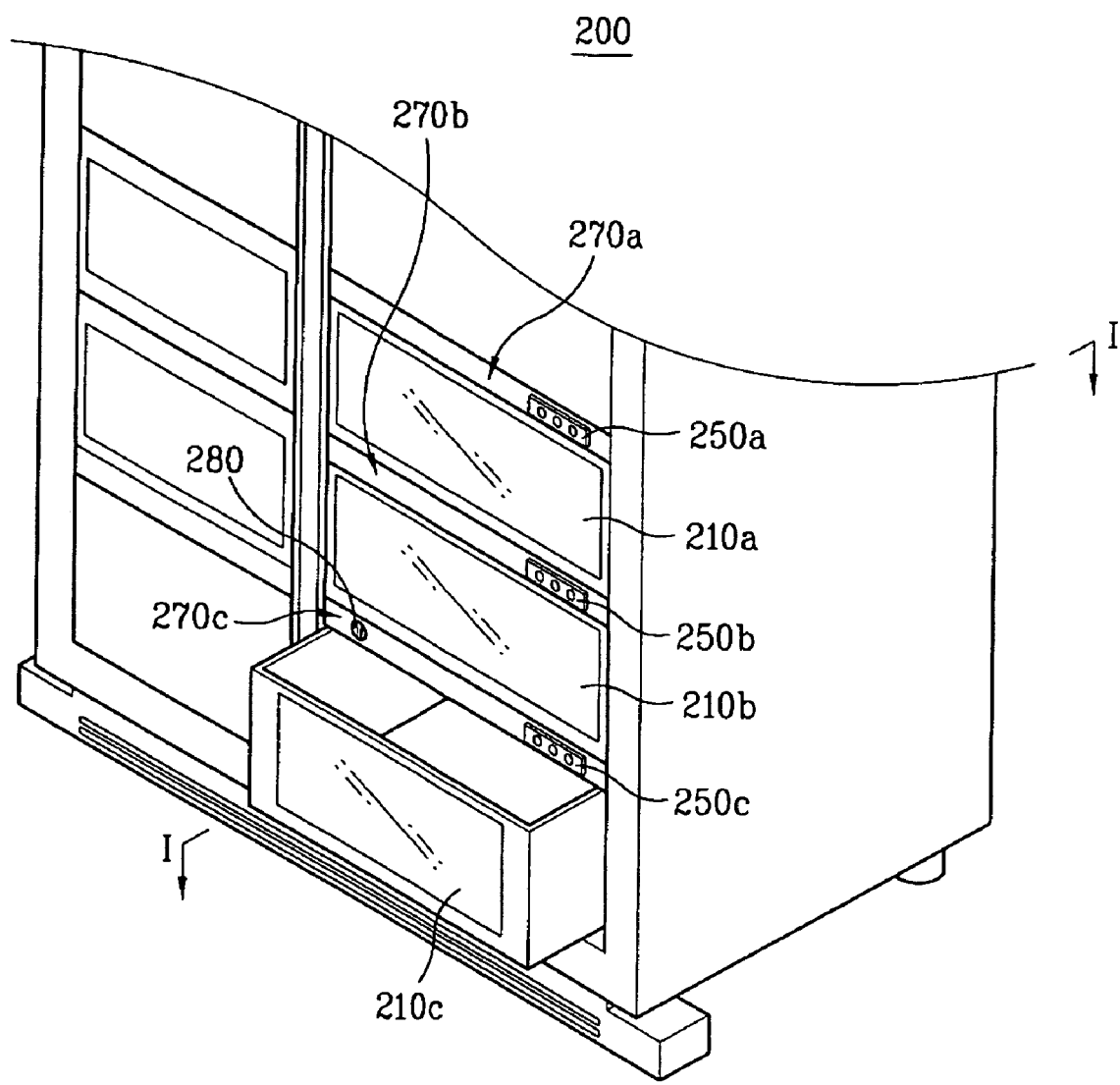
FIG. 3 is a perspective view illustrating a food container of FIG. 2.

Basic constitution of a refrigerator according to one embodiment of the present invention will be described with reference to FIGS. 2 to 4.

In this embodiment of the present invention, among various kinds of refrigerators, a side by side refrigerator is exemplarily shown. The side by side refrigerator 100 includes a refrigerating chamber and a freezing chamber, which are respectively provided at right and left sides of a main body of the refrigerator 100. The side by side refrigerator further 100 further includes a food container 200 provided at the lower portion of the refrigerating chamber inside the main body.

The food container 200 includes a plurality of keeping compartments 210a, 210b and 210c, a plurality of irradiation devices 230a, 230b and 230c, and a plurality of selection devices 250a, 250b and 250c.

The plurality of keeping compartments 210a, 210b and 210c are formed by the bottom and both sidewalls to keep food therein. In this embodiment, the keeping compartments 210a, 210b and 210c are opened and closed in a sliding mode so that a user can easily put or take food in or out of the keeping compartments.

However, the opening and closing mode of the keeping compartments 210a, 210b and 210c are not limited to such a sliding mode. Various modifications may be made to the opening and closing mode of the keeping compartments 210a, 210b and 210c. For example, a hinge type door may be provided at the upper portion of the keeping compartments 210a, 210b and 210c to open and close the keeping compartments 210a, 210b and 210c from the upper portion.

Preferably, the keeping compartments 210a, 210b and 210c are designed in a closed structure to prevent moisture from being leaked out. In this case, humidity in the keeping compartments 210a, 210b and 210c can be maintained uniformly for a long time by water transpired from the food.

Meanwhile, a plurality of keeping compartments partitioned from one another may be provided. In this embodiment, the food container 200 exemplarily includes a total of three keeping compartments 210a, 210b and 210c partitioned up and down separated by panels 270a, 270b and 270c as shown in FIG. 4.

At least one of the keeping compartments 210a, 210b and 210c may further include a temperature controller 280 that controls a temperature inside the keeping compartments 210a, 210b and 210c to keep meat and vegetables.

The irradiation devices 230a, 230b and 230c serve to irradiate light of a visible ray area to each of the keeping compartments 210a, 210b and 210c.

For reference, the visible ray means a ray having a wavelength visible to ordinary sight, and, although depending upon sight, generally has a wavelength in the range of 380 nm to 770 nm. Each wavelength characteristic depends on each color in the visible ray, wherein the wavelength becomes short toward purple color from red color. For example, in case of a single colored light, red color has a wavelength in the range of 700 nm to 610 nm, orange color 610 nm to 590 nm, yellow color 590 nm to 570 nm, green color 570 nm to 500 nm, blue color 500 nm to 450 nm, and purple color 450 nm to 400 nm.

If the irradiation devices 230a, 230b and 230c irradiate light of an infrared ray area having a wavelength longer than 770 nm, the temperature inside the keeping compartments 210a, 210b and 210c and a surface temperature of the food kept in the keeping compartments increase together to discolor the surface of the food, thereby adversely affecting freshness of the food. Accordingly, the irradiation devices 230a, 230b and 230c preferably irradiate light of the visible ray area.

However, since red color based visible and infrared ray areas and purple color based visible and ultraviolet ray areas are not exactly divided from one another, the visible ray area mentioned in the present invention includes some of infrared and ultraviolet ray areas in the wavelength range adjacent to the visible ray area.

Meanwhile, the irradiation devices 230a, 230b and 230c include substrates 233a, 233b and 233c, light emitting devices 231a, 231b and 231c provided on the substrates 233a, 233b and 233c, and protective covers 237a, 237b and 237c preventing moisture from being permeated into the light emitting devices 231a, 231b and 231c to protect the light emitting devices 231a, 231b and 231c from damage.

The light emitting devices 231a, 231b and 231c have no limitation in their kinds but preferably include a plurality of light emitting diodes (LEDs). Since the LEDs emit less heat than the other light emitting devices 231a, 231b and 231c and have relatively high efficiency, they are suitable for the food container 200.

In this embodiment, the light emitting devices 231a, 231b and 231c are comprised of LEDs to minimize emission of heat from the irradiation devices 230a, 230b and 230c, whereby temperature increase of the light emitting devices 231a, 231b and 231c can be minimized and the irradiation devices 230a, 230b and 230c can be driven at lower power than that of the other irradiation devices.

Meanwhile, the irradiation devices 230a, 230b and 230c are set so that colors of light emitted from the irradiation devices correspond to those of the food kept in the keeping compartments 210a, 210b and 210c.

The inventor of this invention has found through experiments that it is most effective to maintain freshness and nutritious elements of the food when light emitting colors most effective for the food kept in the keeping compartments depend on colors of the food kept in the keeping compartments, red light is irradiated if color of the food kept in the keeping compartments is red based color, and green light is irradiated if color of the food kept in the keeping compartments is green based color.

Considering the above experimental data, in this embodiment, various kinds of foods are sorted depending on their colors to set corresponding light emitting colors of light irradiated from the irradiation devices. In more detail, the irradiation devices 230a, 230b and 230c are set to irradiate light of red color to the food kept in the keeping compartments if color of the food is red based color and also irradiate light obtained by combination of green and white to the food kept in the keeping compartments if color of the food is green based color.

Particularly, the inventor of this invention has found through experiments that it is more effective to maintain freshness of the food and prevent the concentration of chlorophyll from being reduced when the irradiation devices irradiate light obtained by combination of green and white to the green colored food as mentioned above than when the irradiation devices irradiate green light only to the green colored food.

For reference, the food kept in the food container 200 can mainly be divided into vegetables and fruits. The vegetables can be subdivided into a thallophyte using leaf or stem, rootcrops using root or subterranean stem, and fruits and vegetables using fruit depending on their uses.

In the present invention, various kinds of vegetables and fruits are divided into red based vegetables and fruits and green based vegetables and fruits depending on their colors, so that light emitting colors of light irradiated from the irradiation devices depend on corresponding vegetables and fruits.

Examples of the red based food include strawberry, tomato, and plum while examples of the green based food include spinach, cabbage and pak choi.

The inventor of this invention has measured freshness transition of the food kept in the keeping compartments after the lapse of a certain time period by dividing food into red based food and green based food as described above, irradiating light to the red based food using the red LED, and irradiating light to the green based food using the LED obtained by combination of green and white.

As a result, it has been checked that discoloration and drying phenomena of the green based food are remarkably reduced and little mold and soften phenomena of the red based food occur in comparison with the case where light is irradiated to the food using the visible ray based white LED.

Figure 4:
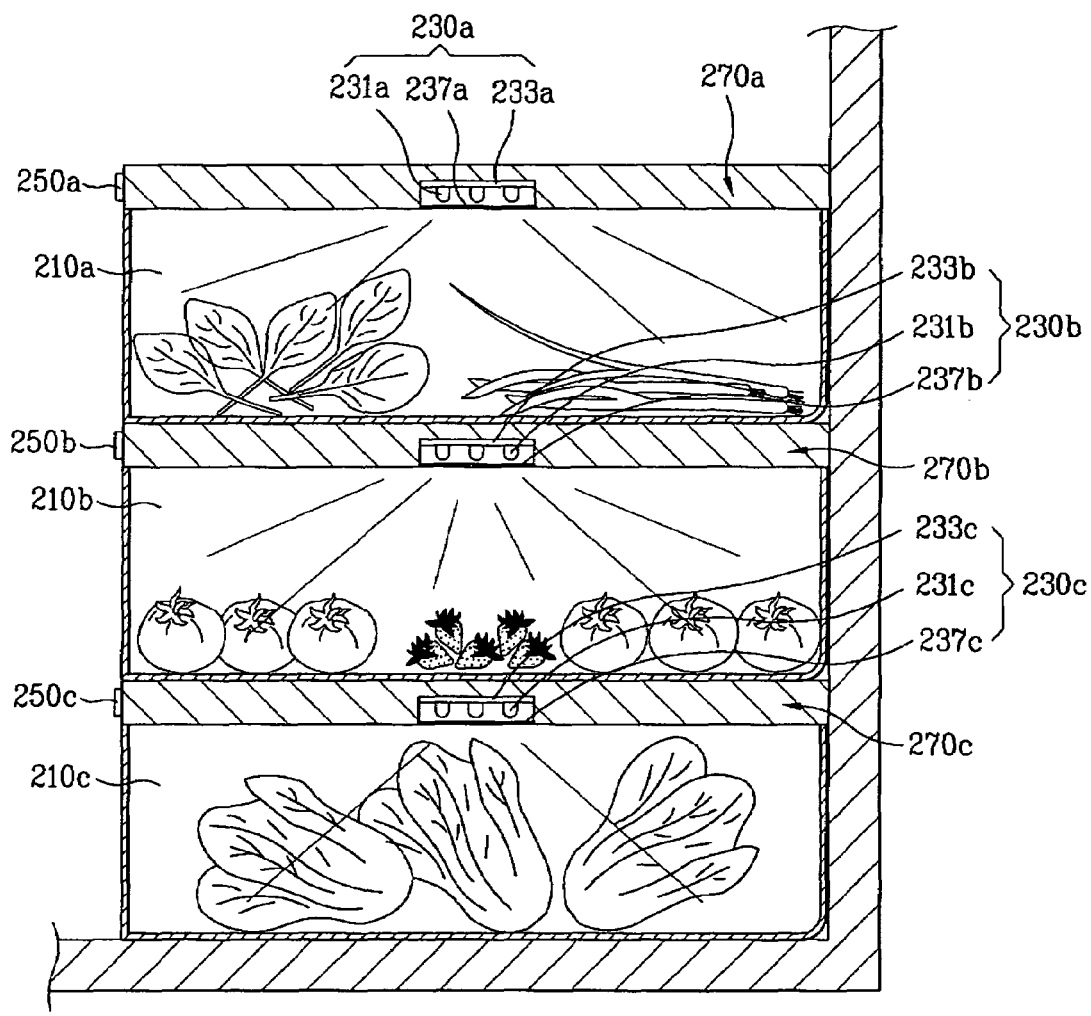
FIG. 4 is a sectional view taken along line I-I of the food container shown in FIG. 3.

FIG. 4 exemplarily illustrates the use state of the keeping compartments. Referring to FIG. 4, pak choi and green onion corresponding to the green based food are kept in the first keeping compartment 210a positioned at the uppermost portion, tomato and strawberry corresponding to the red based food are kept in the second keeping compartment 210b positioned at the middle portion, and Chinese cabbage corresponding to the green food is kept in the third keeping compartment 210c positioned at the lowest portion.

Meanwhile, there is no limitation in the position of the irradiation devices 230a, 230b and 230c. In other words, the irradiation devices 230a, 230b and 230c may be provided above or below the keeping compartments 210a, 210b and 210c. In this embodiment, the irradiation devices 230a, 230b and 230c are provided above the keeping compartments 210a, 210b and 210c as shown in FIG. 4.

The selection devices 250a, 250b and 250c are provided at the front of respective upper panels 270a, 270b and 270c. Referring to FIG. 3, the selection devices 250a, 250b and 250c are comprised of three buttons, wherein buttons corresponding to the red based food and the green based food are respectively provided and a button for turning on/off the irradiation devices 230a, 230b and 230c is provided.

Meanwhile, the selection devices 250a, 250b and 250c serve to switch light emitting color of light irradiated from the irradiation devices to correspond to color of the selected food. For example, the selection devices 250a, 250b and 250c perform switching from the red LED to irradiate light obtained by combination of the green and white LEDs to the first keeping compartment 210a or perform switching from the combination of the green and white LEDs to irradiate light of the red LED.

As described above, the selection devices 250a, 250b and 250c allow the user to select whether color of the food kept in the keeping compartments is red based color or green based color through a button, and switch either the red LED to irradiate light obtained by combination of the green and white LEDs or the green and white LEDs to irradiate light of the red LED, so as to corresponds to color of the selected food.

Alternatively, if a recognition device (not shown) such as a camera that can recognize color of the food kept in the keeping compartments, instead of the selection devices 250a, 250b and 250c, is mounted in the keeping compartments 210a, 210b and 210c, the recognition device determines color of the food kept in the keeping compartments and irradiates corresponding light obtained by combination even though the user does not divide color of the food in advance, thereby improving convenience in use.

Meanwhile, although not shown, the food container 200 preferably includes a sensor that senses whether the keeping compartments 210a, 210b and 210c are opened or closed. Also, the irradiation devices 230a, 230b and 230c are preferably configured to irradiate light only if the keeping compartments are closed after the sensor senses whether the keeping compartments 210a, 210b and 210c are opened or closed.

Figure 5:
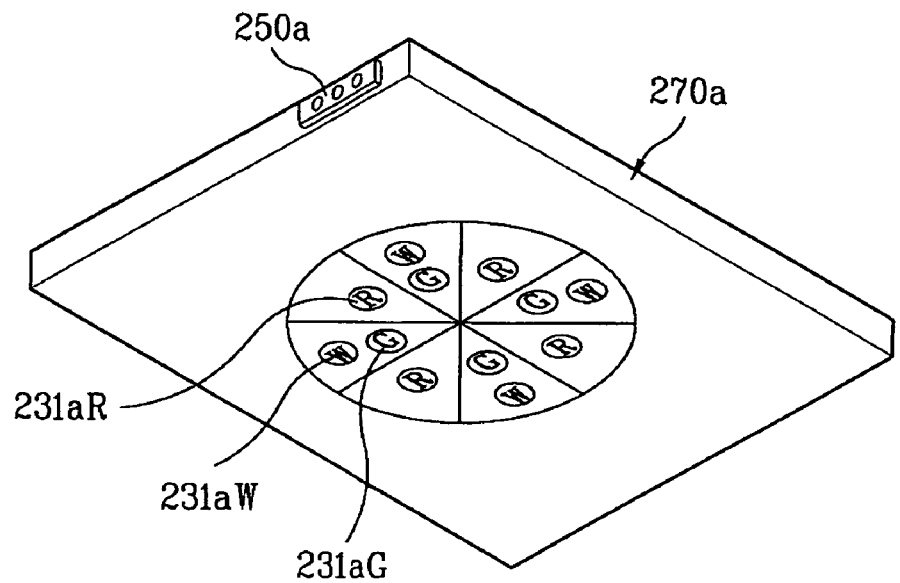
FIG. 5 is a bottom perspective view illustrating an upper panel of FIG. 4.

Arrangement of the light emitting devices of the refrigerator according to another embodiment of the present invention will be described with reference to FIG. 5.

Various kinds of position and arrangement of the light emitting devices 231a, 231b and 231c may be provided. Preferably, the light emitting devices 231a, 231b and 231c are arranged to uniformly irradiate light to the food kept in the keeping compartments. FIG. 5 illustrates an example of the position and arrangement of the light emitting devices 231a, 231b and 231c, in which an irradiation device corresponding to the first keeping compartment 210a of the three keeping compartments 210a, 210b and 210c is provided. As shown in FIG. 5, the red LED 231aR, the green LED 231aG and the white LED 231aW are arranged at the center of the upper panel 270a provided above the keeping compartment 210a.

In more detail, the red, green and white LEDs 231aR, 231aG and 231aW are arranged at fan shaped spaces divided from a circle at a uniform angle.

Since the green and white LEDs 231aG and 231W are configured to together irradiate light to the green based food, they are arranged at their respective fan-shaped spaces to adjoin each other.

The light emitting devices are preferably configured to have a great irradiation angle of light so that light can uniformly be irradiated to the food kept in the keeping compartments.

As described above, although the red, green and white light emitting devices are exemplarily used as the irradiation devices in this embodiment, blue and yellow light emitting devices may also constitute the irradiation devices.

Figure 6:
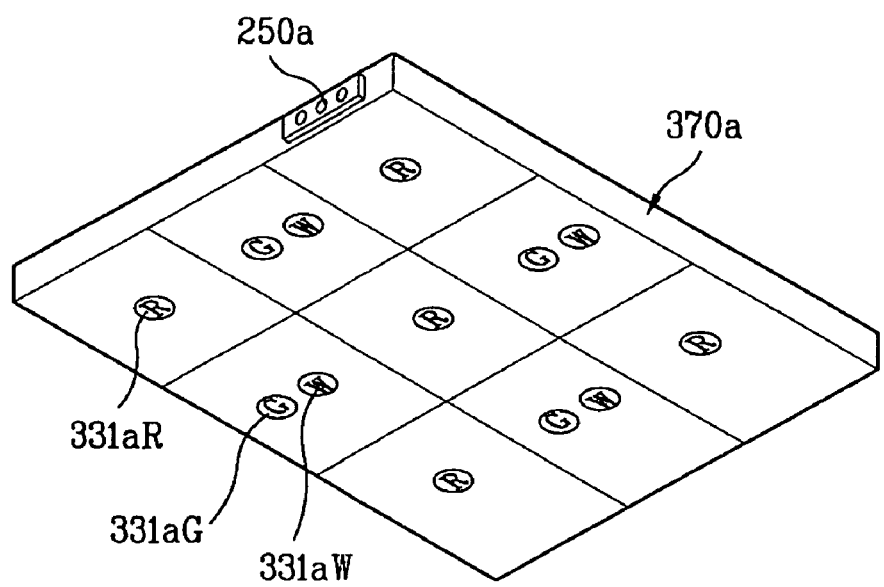
FIG. 6 is a bottom perspective view illustrating an upper panel according to another food container.

A refrigerator according to another embodiment of the present invention will be described with reference to FIG. 6.

For convenience, an upper panel 370a corresponding to the first keeping compartment 210a positioned at the uppermost will be described.

The basic configuration of the refrigerator according to another embodiment of the present invention will be the same as that according to one embodiment of the present invention. The irradiation device 230a is not concentrated on the center of the upper panel 370a but arranged on the upper panel 370a at a constant interval.

In other words, to uniformly irradiate light to the food, the red LED 331aR and the green and white LEDs 331aG and 331aW are arranged at constant intervals in horizontal and vertical directions over the whole upper panel 370a provided above the keeping compartment 210a.

Meanwhile, since the green and white LEDs 331aG and 331aW irradiate light to the green based food in combination as described above, they are arranged at their respective fan shaped spaces to adjoin each other.

Figure 7:
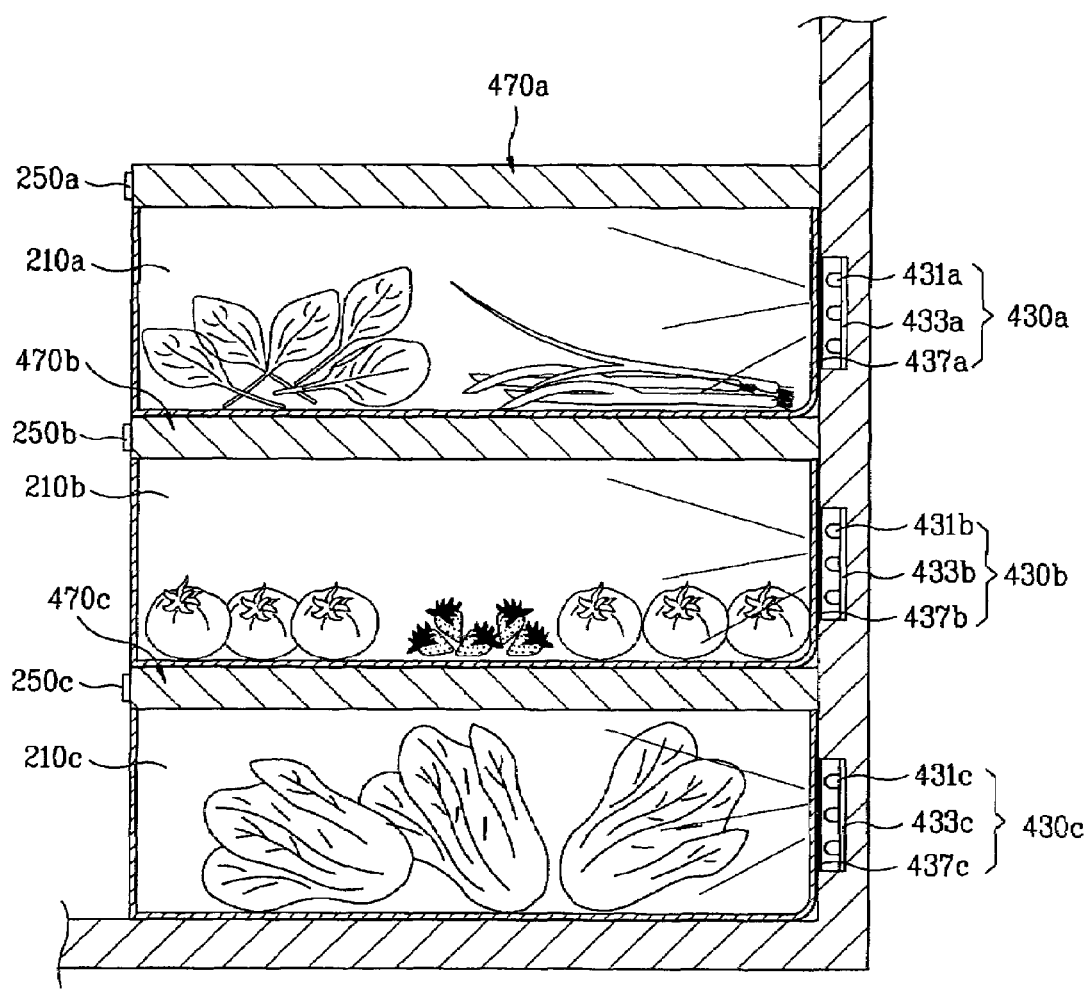
FIG. 7 is a sectional view taken along line I-I, illustrating another example of a food container of FIG. 3.

A refrigerator according to another embodiment of the present invention will be described with reference to FIG. 7.

Unlike the aforementioned embodiments, in this embodiment, irradiation devices 430a, 430b and 430c are provided at the outer rear of the keeping compartments 210a, 210b and 210c not above the keeping compartments 210a, 210b and 210c.

In other words, the irradiation devices 430a, 430b and 430c are formed at the rear outside the keeping compartments in a single body with the main body of the refrigerator. Thus, light is irradiated from the irradiation devices 430a, 430b and 430c into the keeping compartments 210a, 210b and 210c through the sidewalls constituting the keeping compartments 210a, 210b and 210c. To this end, in this embodiment, the sidewalls constituting the keeping compartments 210a, 210b and 210c are preferably formed of material that can transmit light.

Meanwhile, in the same manner as the aforementioned embodiments, the irradiation devices include substrates 433a, 433b and 433c allowing light to be irradiated to each of the keeping compartments 210a, 210b and 210c divided up and down by 470a, 470b and 470c light emitting devices 431a, 431b and 431c provided on the substrates 433a, 433b and 433c, and protective covers 437a, 437b and 437c preventing moisture from being permeated into the light emitting devices 431a, 431b and 431c to protect the light emitting devices 431a, 431b and 431c from damage.

Although the irradiation devices 430a, 430b and 430c are configured so that the light emitting devices 431a, 431b and 431c are concentrated at one side of the outer rear in this embodiment, they may be arranged at constant intervals in horizontal and vertical directions over the wide range at the outer rear in the same manner as the aforementioned embodiments.

A refrigerator according to another embodiment of the present invention will be described with reference to FIGS. 8 to 10.

Figure 8:
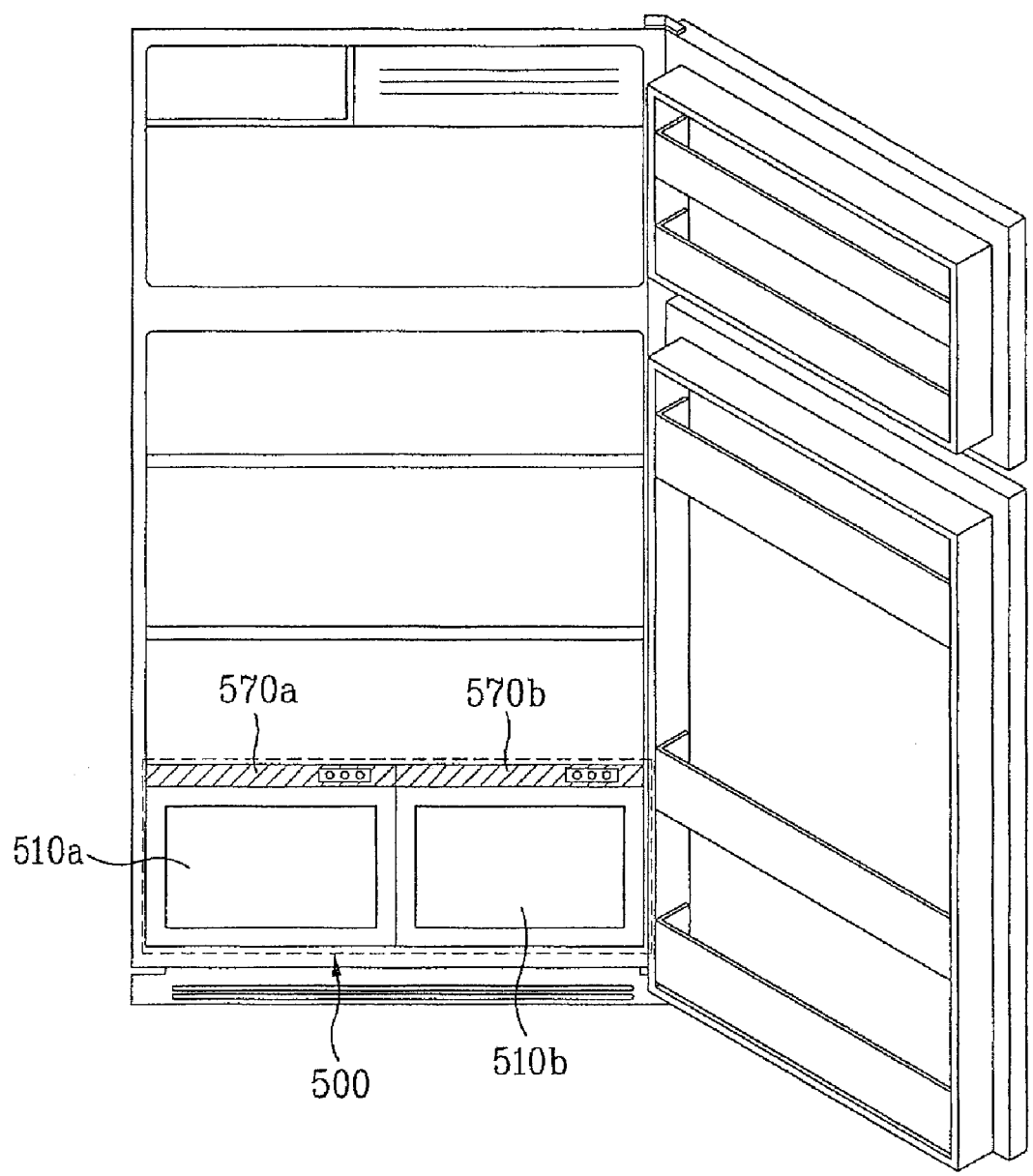
FIG. 8 is a perspective view illustrating the state that a food container according to the present invention is applied to a top mount type refrigerator.
Figure 9:
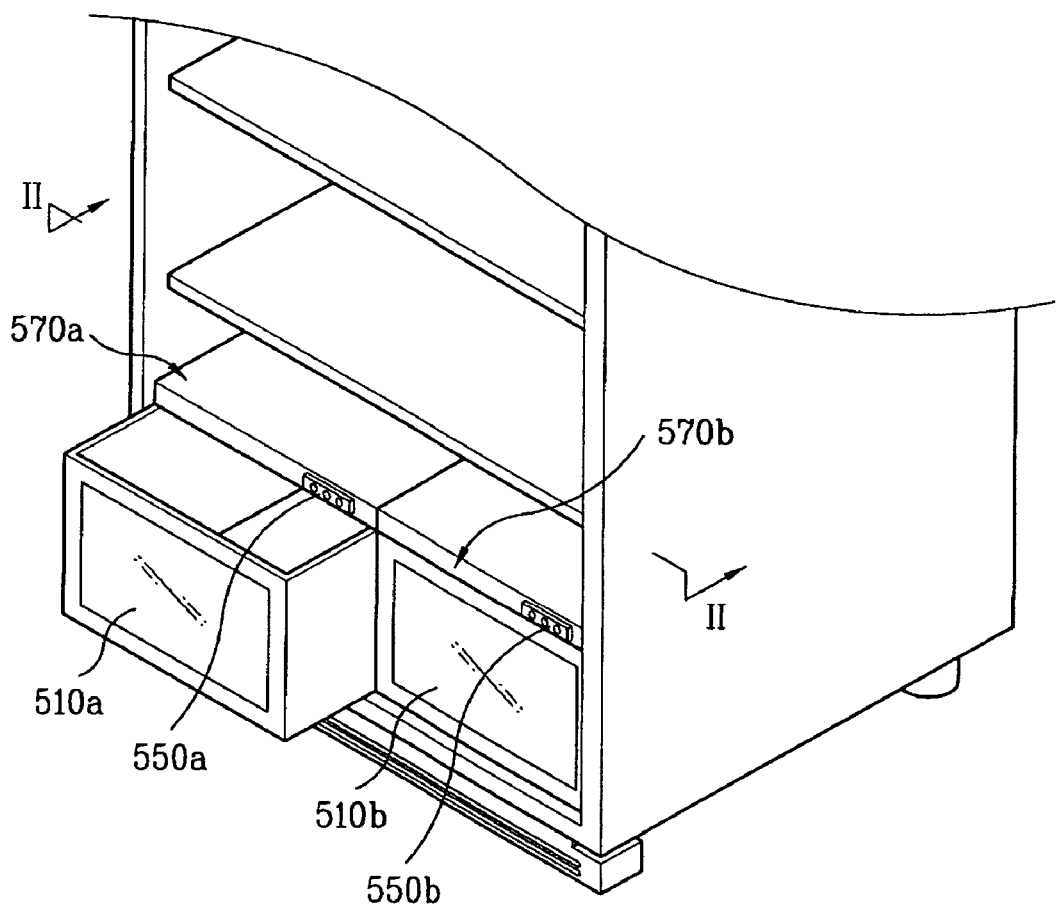
FIG. 9 is a perspective view illustrating a food container of FIG. 8.

As shown in FIG. 8, a food container 500 is applied to a top mount type refrigerator which includes a freezing chamber at the upper portion and a refrigerating chamber at the lower portion.

The food container 500 is arranged at the lower portion of the refrigerating chamber, and includes two keeping compartments 510a and 510b arranged at left and right sides.

Figure 10:
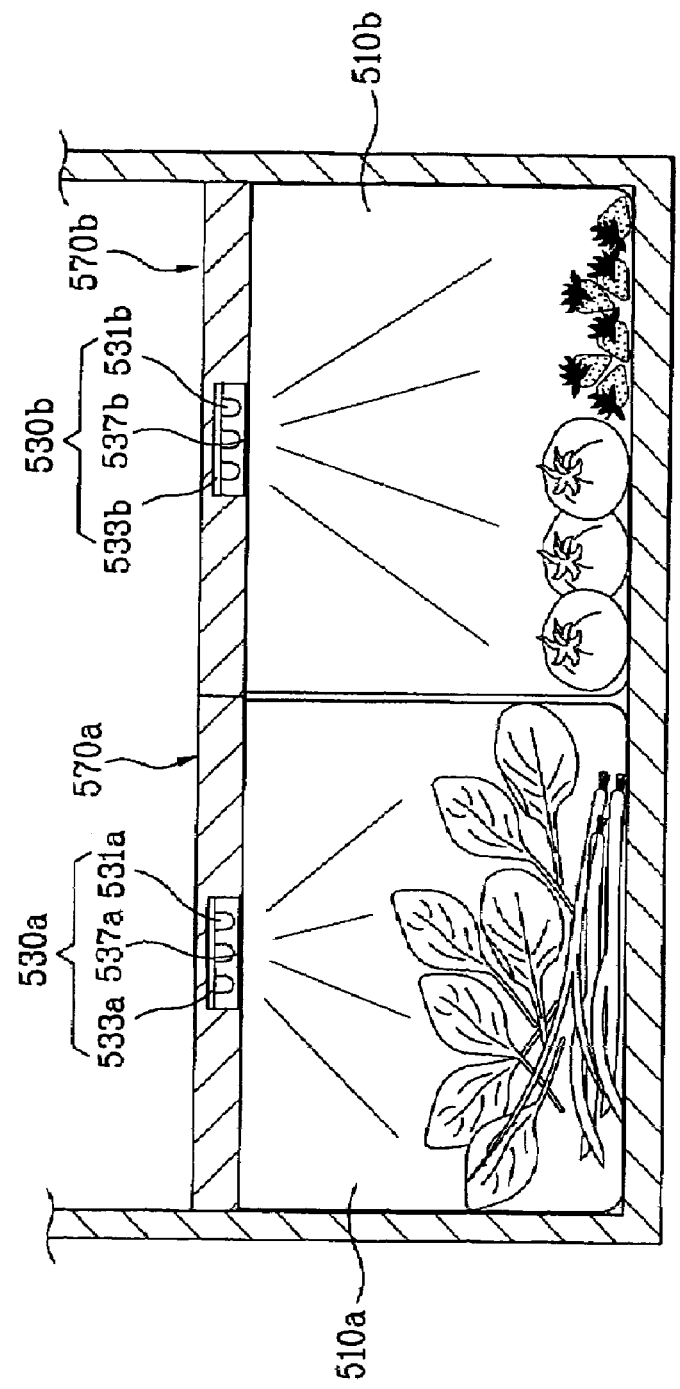
FIG. 10 is a sectional view taken along line II-II, illustrating another example of a food container of FIG. 9.

Referring to FIG. 10, the green based foods such as pak choi and green onion are kept in the first keeping compartment 510a while the red based foods such as tomato and strawberry are kept in the second keeping compartment 510b.

In other words, in this embodiment, the food container 500 includes a plurality of keeping compartments 510a and 510b divided into left and right sides, irradiation devices 530a and 530b, including light devices 531a and 531b on substrates 533a and 533b and covers 537a and 537b irradiating light of a visible ray area to each of the keeping compartments 510a and 510b, and selection devices 550a and 550b selecting color of the food kept in the keeping compartments and switching light emitting colors of the irradiation devices.

As shown in FIG. 10, although the irradiation devices are exemplarily arranged at the center of upper panels 570a and 570bprovided above the keeping compartments 510a and 510b, they may be arranged at constant intervals in horizontal and vertical directions or at the outer rear of the keeping compartments 510a and 510bto irradiate light through the keeping compartments 510a and 510b.

The operation principle of the refrigerator according to the aforementioned embodiments of the present invention will now be described.

First, the user keeps the food by dividing the food depending on color of the food or the recognition device determines color of the food. Light of the visible ray area is irradiated to each of the keeping compartments divided depending on color of the food. At this time, light emitting color of the irradiated light is set to correspond to color of the food kept in the keeping compartments.

Accordingly, since the user can select color of the food through the selection devices or the refrigerator can automatically recognize color of the food, it is possible to conveniently switch light emitting color to correspond to color of the food kept in the keeping compartments.

An example of the selection devices according to the present invention will be described with reference to FIG. 11.

In this embodiment, the selection devices 250a, 250band 250c are provided at the front of the upper panels 270a, 270band 270c. FIG. 11 illustrates the selection device 250a corresponding to the first keeping compartment 210a among the selection devices 250a, 250b and 250c.

In this embodiment, the selection device 250a is comprised of four buttons, i.e., an off button 251a, a red selection button 253a, a green selection button 255a, and a switch mode selection button 257a.

The off button 251a serves to select the off-operation of the irradiation devices and is selected when the operation of the irradiation devices 230a, 230b and 230c is stopped.

The red selection button 253a serves to select the red based food. Preferably, the red selection button 253a exemplarily displays the red based food to enhance a discriminating power of the user. It is more preferable that color of the red selection button 253a is red.

The green selection button 255a serves to select the green based food. Similarly to the red selection button 253a, the green selection button 255a exemplarily displays the green based food to enhance a discriminating power of the user. It is preferable that color of the green selection button 255a is green.

The switch mode selection button 257a serves to select a switch mode of a light emitting color of irradiated light depending on time as described above.

Figure 11:
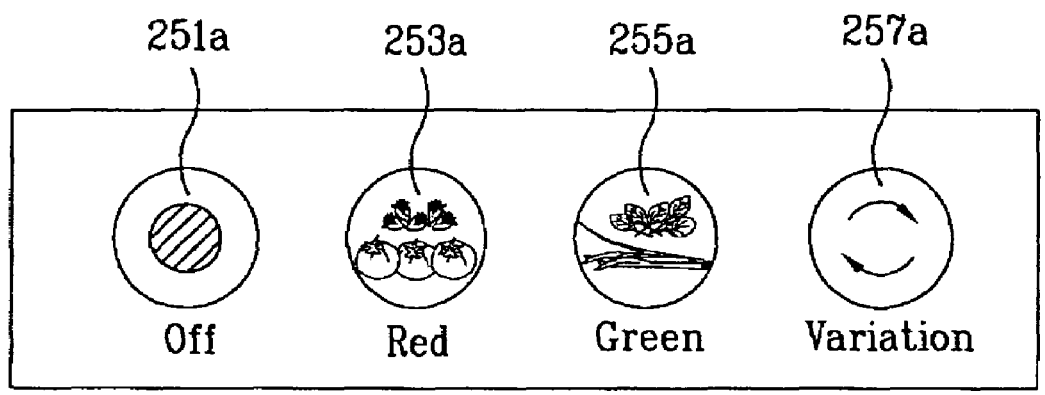
FIG. 11 is a front view illustrating a selection device.

Although FIG. 11 illustrates the button type selection devices, various modifications may be made to the selection devices. For example, the selection devices may be configured so that selection levers may be rotated.

In the present invention, the selection devices 250a, 250b and 250c are provided as above, so that the user can directly select color of the food to switch a light emitting color or select the switch mode to switch the light emitting color of the irradiated light depending on time, thereby uniformly maintaining freshness of the food kept in the keeping compartments.

Meanwhile, if single colored foods are kept in the keeping compartment, light of a light emitting color corresponding to the single colored foods is irradiated to the keeping compartment to maintain freshness of the foods.

However, if a red based food and a green based food are together kept in the keeping compartment, a problem occurs in maintaining freshness of either the red based food or the green based food. For example, in a state that strawberry corresponding to the red based food and pak choi corresponding to the green based food are together kept in one keeping compartment, if light is irradiated to the keeping compartment using the red LED corresponding to the red based color, a problem occurs in that it is effective to maintain freshness of strawberry but less effective to maintain freshness of pak choi.

In this embodiment, to solve the above problem, the irradiation devices 230a, 230b and 230c are configured to switch a light emitting color of their irradiated light depending on time, whereby freshness of the food kept in the keeping compartment can be maintained uniformly. Specifically, the on/off time of the red, white and green LEDs is controlled to switch the light emitting color of the irradiated light depending on time. For example, the selection devices 250a, 250b and 250c are configured so that the red LED 231aR is switched to the green and white LEDs 231aG and 231aW to irradiate light, which is obtained by combination of the green and white LEDs, to the first keeping compartment 210a and, after the lapse of the certain time, the green and white LEDs are switched to the red LED 231aR to irradiate light obtained by the red LED 231aR to the first keeping compartment 210a.

Meanwhile, the irradiation devices 230a, 230b and 230c may be configured to irradiate light obtained by combination of red, green, blue, yellow and white.

The inventor of this invention has found, through experiments, that it is more effective that the irradiation devices 230a, 230b and 230c respectively irradiate light obtained by combination of green and white in case of the green based food, light of white in case of the yellow based food, light obtained by combination of yellow and white in case of the white based food, and light obtained by combination of yellow and white in case of the purple based food.

Meanwhile, there is no limitation in the position of the irradiation devices 230a, 230b and 230c. In other words, the irradiation devices 230a, 230b and 230c may be provided above or below the keeping compartments 210a, 210b and 210c. Alternatively, the irradiation devices 230a, 230b and 230c may be provided at an outer side of the keeping compartments 210a, 210b and 210c.

Figure 12:
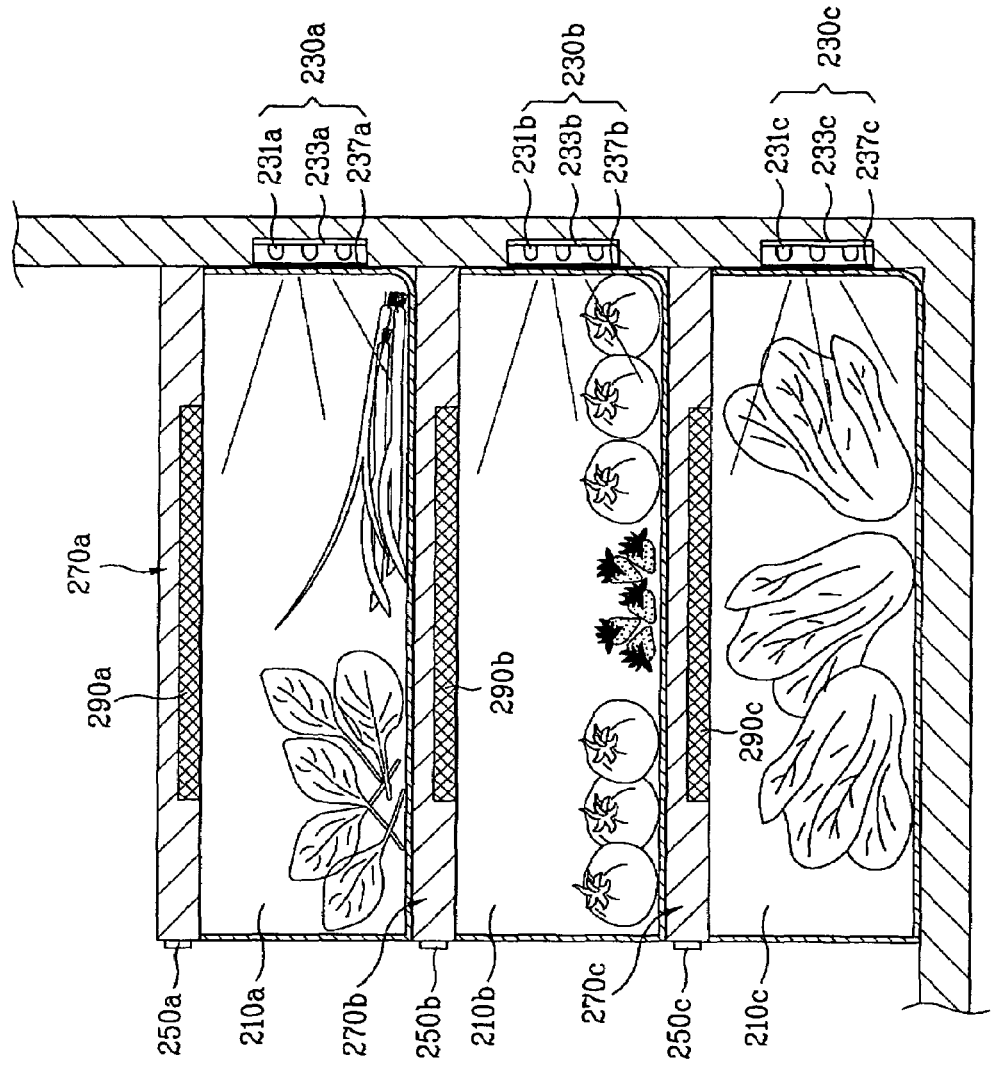
FIG. 12 is a sectional view illustrating a refrigerator according to another embodiment of the present invention.

The irradiation devices 230a, 230b and 230c, as shown in FIG. 12, are provided at the rear outside the keeping compartments 210a, 210b and 210c in a single body with the main body of the refrigerator. The light is irradiated from the irradiation devices 230a, 230b and 230c into the keeping compartments 210a, 210b and 210c through the sidewalls constituting the keeping compartments 210a, 210b and 210c. To this end, the sidewalls constituting the keeping compartments 210a, 210b and 210c are preferably formed of material that can transmit light.

Furthermore, purification devices 290a, 290b and 290c are provided in the keeping compartments 210a, 210b and 210c, and serve to remove ethylene generated from the food kept in the keeping compartments 210a, 210b and 210c.

Generally, ethylene is one of plant aging hormones that expedite separation and decay of fruits or leaves, expedites breakdown of chlorophyll and pigmentation of carotinoid, and improves breathing, so as to expedite aging after harvesting. It is known that such ethylene ripens fruits but quickly decays fruits and quickly wither vegetables or flowers.

Emission rate of ethylene and sensitivity to ethylene are as shown in the following Table.

| Kind | Item name | Emission rate of ethylene (μl/kg-hr) | Sensitivity to ethylene |
|---|---|---|---|
| Vegetables | Cucumber | 0.1~1.0 | High |
|  | Head lettuce, cabbage, broccoli | less than 0.1 | High |
|  | Potato, asparagus | Less than 0.1 | Middle |
| Fruits | Apple | 10.0~100.0 | High |
|  | Pear, apricot, peach, mandarin, orange | 10.0~100.0 | High |
|  | Tomato, banana | 1.0~10.0 | High |
|  | Kiwi, persimmon | 1.0~1.0 | Middle |

In the present invention, the purification devices 290a, 290b and 290c are provided above the keeping compartments 210a, 210b and 210c to control decay and aging of vegetables due to ethylene.

The purification devices 290a, 290b and 290c may have various shapes. Preferably, the purification devices 290a, 290b and 290c are comprised of a plurality of nano carbon balls (NCBs) including palladium (Pd) catalyst.

Active carbon may be used as the purification devices 290a, 290b and 290c.

The active carbon is a porous black powder which is widely used to refine gas or liquid, and serves as an adsorbent that adsorbs a contaminant to a pore on a surface and removes the contaminant to refine gas or liquid.

Meanwhile, if porous size and distribution on the surface of the adsorbent per kind, quantity and concentration of the contaminant is optimized, performance of the adsorbent can be maximized. In this respect, the related business field has continued to study the active carbon but it is difficult to actually maximize performance and efficiency of the active carbon due to limitation in manufacturing the active carbon.

The nano carbon ball constituting the purification devices includes a globular hollow core and a porous carbon shell, wherein an antibacterial metal or metal base is impregnated into the carbon shell. The nano carbon ball can be manufactured by optimizing the size and distribution of the pore depending on the kind of the contaminant using nano technology that can control the size and distribution of the pore at a desired purpose of use. Such nano carbon ball represents excellent performance superior to that of the existing active carbon in refining ethylene.

The inventor of this invention has found that freshness of the food can be maintained more effectively when the purification devices 290a, 290b and 290c are provided along with the irradiation devices 230a, 230b and 230c.

As described above, the selection devices 250a, 250b and 250c serve to select color of the food kept in the keeping compartments 210a, 210b and 210c and switch the light emitting color of the light irradiated from the irradiation devices 230a, 230b and 230c to correspond to the selected color of the food.

In this embodiment, instead of the selection devices 250a, 250b and 250c, the recognition device (not shown) such as a camera, which can recognize color of the food kept in the keeping compartments, may be provided in the keeping compartments 210a, 210b and 210c to recognize the color of the food kept in the keeping compartments, thereby irradiating corresponding light obtained by combination.

Figure 13:
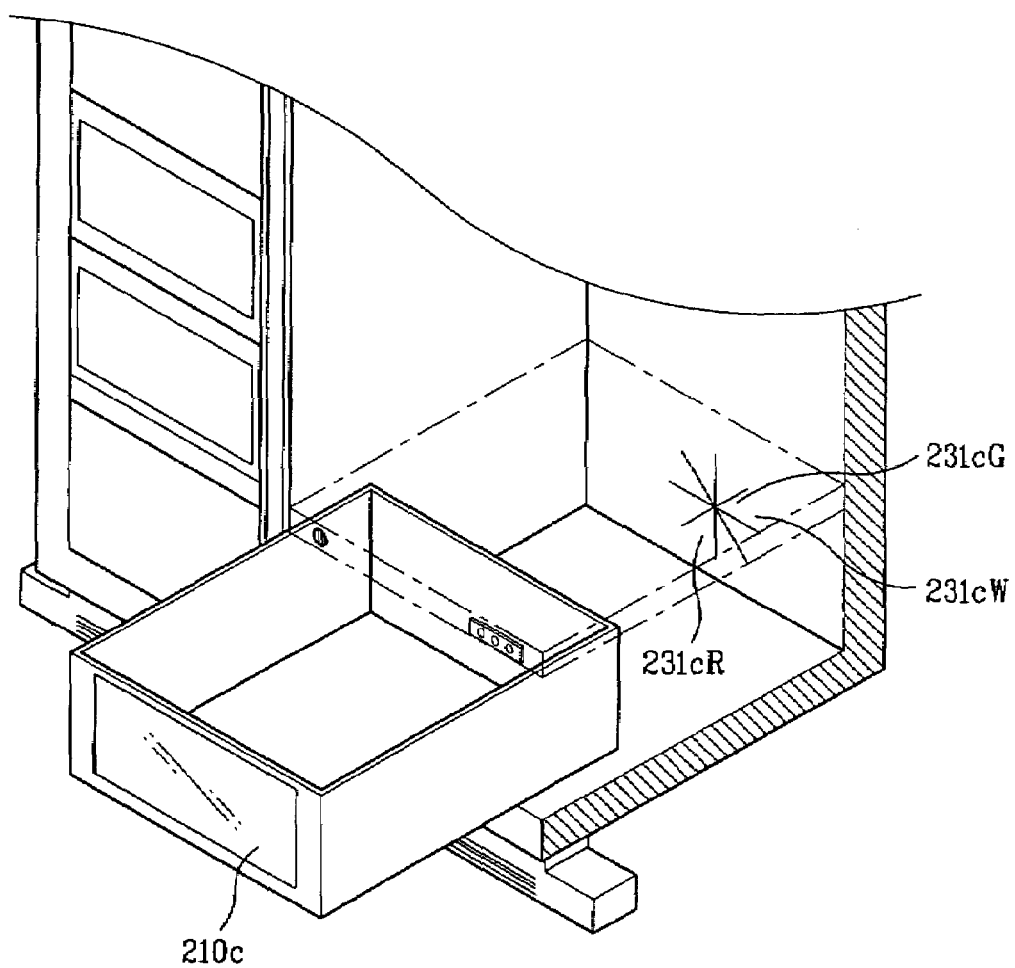
FIG. 13 is a perspective view illustrating the state that a food container of FIG. 2 is applied to a side by side type refrigerator.

Arrangement of the light emitting devices will be described with reference to FIG. 13.

Although the irradiation devices 230a, 230b and 230c are configured so that the light emitting devices 231a, 231b and 231c are concentrated at one side of the outer rear, they may be provided above the keeping compartments or may be provided at constant intervals in horizontal and vertical directions over the wide range from the outside rear.

Figure 14:
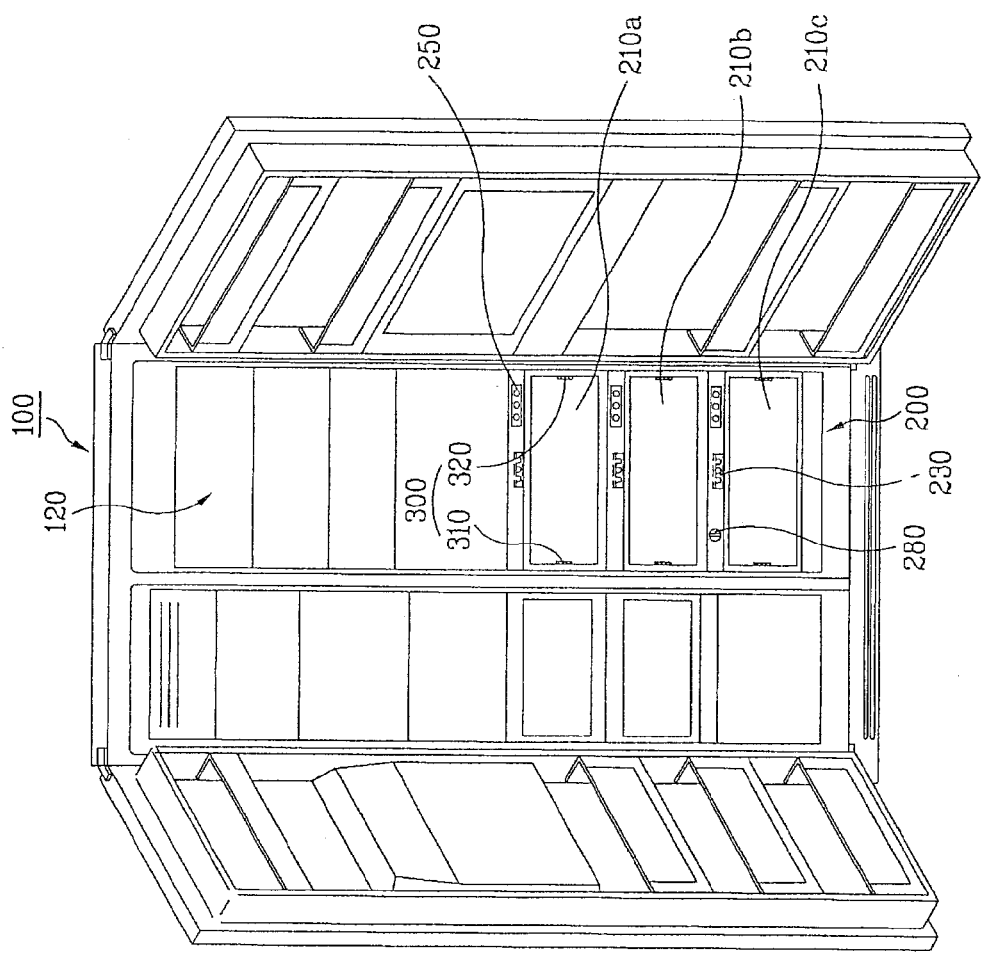
FIG. 14 is a sectional view illustrating a refrigerator according to another embodiment of the present invention.

A refrigerator according to the preferred embodiment of the present invention will be described with reference to FIGS. 14, 15A and 15B.

A sensor 300 is provided at a predetermined position of the refrigerating chamber 120 to sense whether a vegetable box 210a contains vegetables. In other words, according to the present invention, the sensor 300 senses whether vegetables are contained in the vegetable box 210a so that a light source 230 can be turned on only if the vegetables are contained in the vegetable box 210a.

The sensor 300 will now be described in detail.

Anything that can sense whether the vegetables are contained in the vegetable box 210a can be used as the sensor 300. For example, as shown in FIGS. 14 and 15, an optical sensor 300 may be used as the sensor. If the optical sensor 300 is used, the optical sensor 300 includes a light-transmitting portion 310 and a light-receiving portion 320. Also, the optical sensor 300 having a single light-transmitting/receiving portion may be used considering easiness of installation.

The operation of the refrigerator according to the present invention will be described with reference to FIGS. 15A and 15B.

Figure 15A:
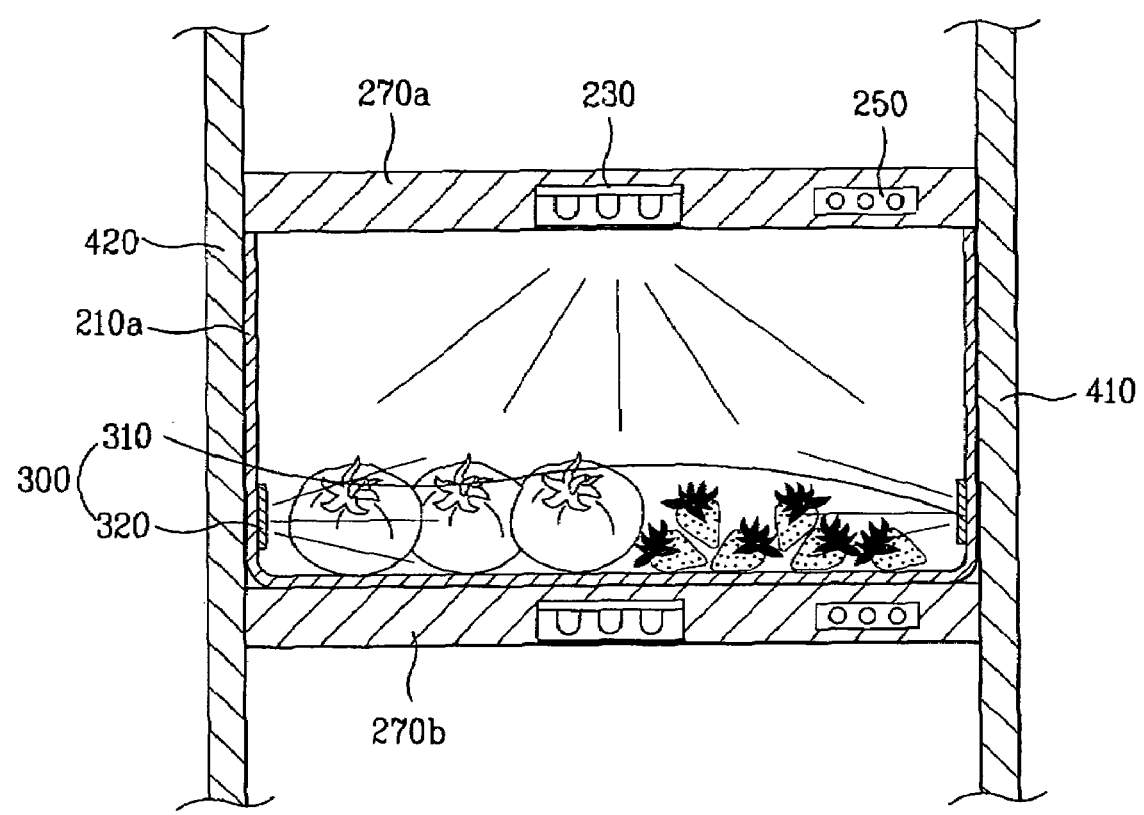

As shown in FIG. 15A, if the vegetables are contained in the vegetable box 210a, light irradiated from the light-transmitting portion 310 does not reach the light-receiving portion 320. Accordingly, a controller (not shown) determines that the vegetables are contained in the vegetable box 210aa and thus turns on the light source 230.

Figure 15B:
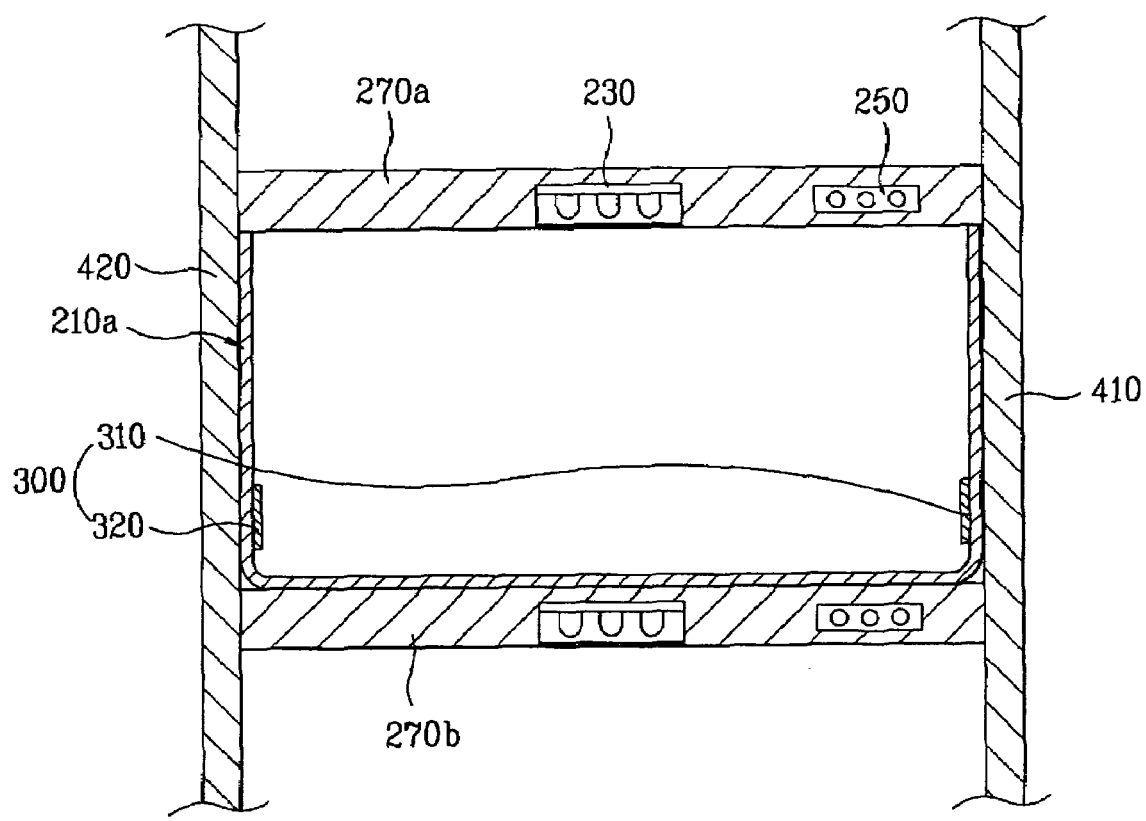

By contrast, as shown in FIG. 15B, if the vegetables are not contained in the vegetable box 210a, the light irradiated from the light-transmitting portion 310 reaches the light-receiving portion 320. Accordingly, the controller determines that the vegetables are not contained in the vegetable box 210a and thus turns off the light source 230.

Figure 16:
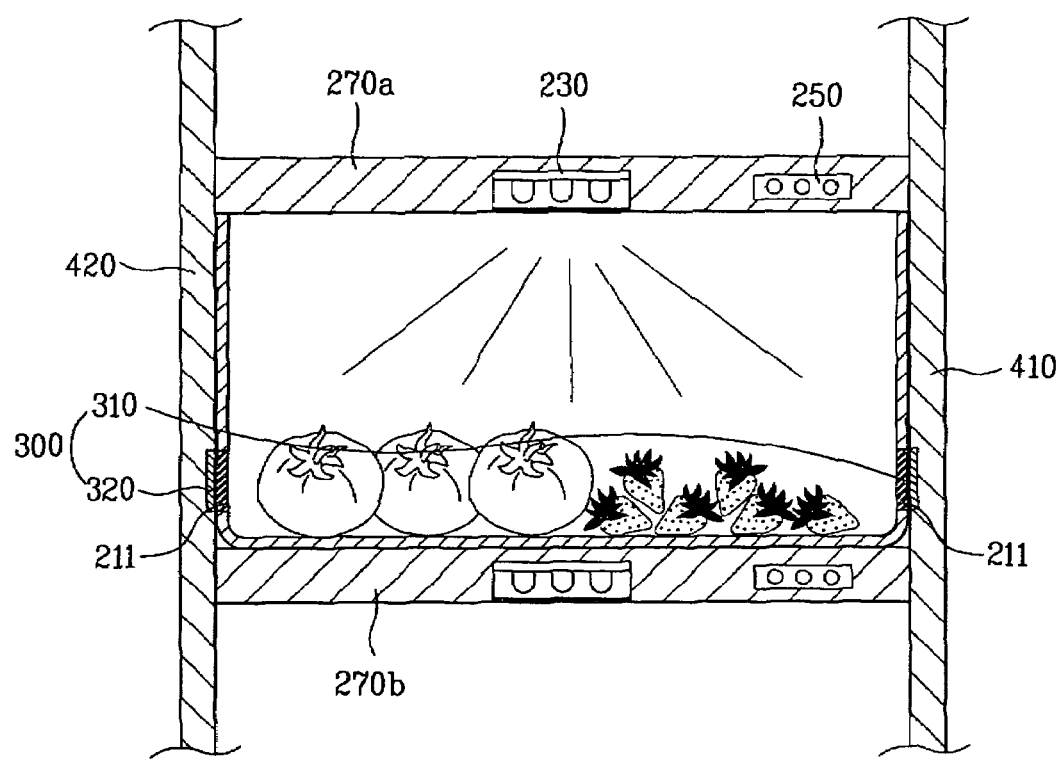
FIG. 16 is a sectional view illustrating a refrigerator according to another embodiment of the present invention.

A refrigerator according to another embodiment of the present invention will be described with reference to FIG. 16.

The principle of the refrigerator according to this embodiment is the same as that of the refrigerator according to the aforementioned embodiments. However, in this embodiment, convenience in installation of the sensor is improved.

In more detail, it has been described in the aforementioned embodiments that the light-transmitting portion 310 and the light-receiving portion 320 of the sensor 300 are provided in the vegetable box 210a. However, in this structure, it is not easy to install an electric wire connected to the sensor 300. Therefore, according to this embodiment, the sensor 300, for example, the light-transmitting portion 310 and the light-receiving portion 320 are provided at sidewalls of the refrigerator, preferably left and right sidewalls 420 and 410. At this time, at least a portion 211 of the vegetable box 210a, which is adjacent to the light-transmitting portion 310 and the light-receiving portion 320, is made of a light transmittive material. Since the operation of the refrigerator according to this embodiment is the same as that according to the aforementioned embodiments, its detailed description will be omitted.

Meanwhile, anything that can sense whether the vegetables are contained in the vegetable box may be used as the sensor. Different kinds of sensors may together be used. In other words, in addition to the optical sensor, a nearby sensor and a weight sensor may be used. If the weight sensor is used, it is preferably provided at a lower sidewall of the vegetable box, i.e., below the vegetable box.

Meanwhile, although the side by side type refrigerator, which includes a refrigerating chamber and a freezing chamber at right and left sides, has been mainly described in the aforementioned embodiments, the present invention is not limited to such a side by side type refrigerator. In other words, the present invention may be applied to a top mount type refrigerator or a French type refrigerator, wherein the top mount type refrigerator includes a freezing chamber at an upper portion and a refrigerating chamber at a lower portion, and the French type refrigerator includes a refrigerating chamber at an upper portion and a freezing chamber at a lower portion.

Furthermore, although the refrigerator having a vegetable box for keeping vegetables and fruits has been described in the aforementioned embodiments, the present invention is not limited to such a refrigerator. For example, the principle of the present invention may be applied to a kimchi refrigerator that mainly keeps kimchi, a rice container that keeps grain, and a wine storage that keeps alcoholic liquors. Moreover, the principle of the present invention may be applied to a storage device that stores other food such as meat.

As described above, the refrigerator and the method for keeping food using the same according to the present invention have the following advantages.

First, since the foods are kept in the keeping compartments depending on their colors and light most suitable for color of the corresponding food is irradiated to the food, it is possible to effectively maintain freshness of the food through the irradiation devices and prevent the concentration of chlorophyll from being reduced.

Second, since the classification standard of the foods kept in the keeping compartments is identified clearly, it is possible to improve the effect obtained by the plurality of keeping compartments.

Third, since the user can select color of the food kept in the keeping compartments or the refrigerator can automatically recognize color of the food, it is possible to manually or automatically set the light emitting color of light suitable for the food kept in the keeping compartments.

Fourth, since the clear and objective standard for selecting the light emitting color of the irradiated light is provided, it is possible to allow the user to easily select the light emitting color and give the user reliability of the irradiation devices.

Fifth, since the light emitting color of the irradiated light is switched depending on time, freshness of every food can be maintained uniformly if various kinds of foods are kept in the keeping compartments.

Sixth, since the light source is turned off if vegetables are not contained in the vegetable box, it is possible to avoid power consumption and prevent a temperature of the refrigerating chamber and/or the vegetable box from unnecessarily increasing.

Finally, since the purification devices effectively remove ethylene generated from the food kept in the keeping compartments, they can more effectively maintain freshness of the food along with the irradiation devices.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A refrigerator, comprising:
   a main body;
   at least one storage compartment provided in the main body, the at least one storage compartment being configured to receive and store food items therein; and
   at least one irradiation device corresponding to the at least one storage compartment, wherein the at least one irradiation device irradiates light in a visible range into the at least one storage compartment, wherein a wavelength of light emitted by the at least one irradiation device is based on a predetermined standard, and is switched to correspond to a color of food items stored in the at least one storage compartment.

2. The refrigerator as claimed in claim 1, wherein the at least one irradiation device includes light emitting diodes (LEDs).

3. The refrigerator as claimed in claim 1, further comprising a sensor that senses whether one or more food items are stored in the at least one storage compartment, wherein the at least one irradiation determines whether to irradiate light into the at least one storage compartment based on the sensed result of the sensor.

4. The refrigerator as claimed in claim 3, wherein the sensor is an optical sensor.

5. The refrigerator as claimed in claim 4, wherein the optical sensor is provided at a sidewall of at least one of the plurality of storage compartments.

6. The refrigerator as claimed in claim 4, wherein the sensor is a weight sensor.

7. The refrigerator as claimed in claim 1, further comprising at least one purification device provided in the at least one storage compartment, wherein the at least one purification device is configured to remove ethylene generated by food items stored in the at least one storage compartment.

8. The refrigerator as claimed in claim 7, wherein the at least one purification device includes a palladium catalyst.

9. The refrigerator as claimed in claim 7, wherein the at least one purification device includes a globular hollow core and a porous carbon shell, the porous carbon shell including a plurality of nano carbon balls into which antibacterial metal or metal base is impregnated.

10. The refrigerator as claimed in claim 1, wherein the at least one storage compartment comprises a plurality of storage compartments, and the at least one irradiation device comprises a plurality of irradiation devices respectively provided with the plurality of storage compartments.

11. The refrigerator as claimed in claim 1, further comprising at least one selection device configured to receive an input indicating a type of food items stored in the at least one storage compartment and to adjust the wavelength of light irradiated by the at least one irradiation device into the at least one storage compartment to correspond to the color of the food items.

12. The refrigerator as claimed in claim 1, further comprising a recognition device that detects the color of the food items stored in the at least one storage compartment and that adjusts the wavelength of the light irradiated by the at least one irradiation into the at least one storage compartment to correspond to detected color of the food items.

13. The refrigerator as claimed in claim 1, wherein the at least one irradiation device adjusts the wavelength of the light irradiated into the at least one storage compartment based on time.

14. The refrigerator as claimed in claims 13, wherein the at least one irradiation device periodically adjusts the wavelength of light irradiated into the at least one storage compartment.

15. The refrigerator as claimed in any one of claims 1, wherein the at least one irradiation device irradiates light obtained by a combination of wavelengths of red, green and white.

16. The refrigerator as claimed in claim 15, wherein the at least one irradiation device also irradiates light obtained by a combination of wavelengths of yellow and blue.

17. The refrigerator as claimed in claim 1, wherein the at least one irradiation device irradiates a red wavelength if the color of the food items stored in the at least one storage compartment is red based.

18. The refrigerator as claimed in claim 1, wherein the at least one irradiation device irradiates a green wavelength if the color of the food items stored in the at least one storage compartment is green based.

19. The refrigerator as claimed in claim 18, wherein the at least one irradiation device irradiates light including a white wavelength.

* * * * *